United States Patent
Williams

[19]

[11] Patent Number: 5,911,644
[45] Date of Patent: Jun. 15, 1999

[54] TWO-SPEED TRANSFER CASE WITH SYNCHRONIZED RANGE SHIFT MECHANISM

[75] Inventor: Randolph C. Williams, Weedsport, N.Y.

[73] Assignee: New Venture Gear, Inc., Troy, Mich.

[21] Appl. No.: 08/990,307

[22] Filed: Dec. 15, 1997

[51] Int. Cl.[6] ...................................................... F16H 3/44
[52] U.S. Cl. .................. 475/295; 74/665 GA; 74/665 T; 475/303
[58] Field of Search ..................................... 475/295, 303, 475/332; 74/665 GA, 665 GE, 665 T

[56] References Cited

U.S. PATENT DOCUMENTS

| | | |
|---|---|---|
| 4,569,252 | 2/1986 | Harper . |
| 4,770,280 | 9/1988 | Frost . |
| 4,805,484 | 2/1989 | Hiraiwa ................................. 74/665 T |
| 4,901,598 | 2/1990 | Batchelor et al. .................. 74/665 GA |
| 5,006,098 | 4/1991 | Yoshinaka et al. .................... 74/665 T |
| 5,054,335 | 10/1991 | Andrews . |
| 5,105,902 | 4/1992 | Wilson et al. . |
| 5,226,860 | 7/1993 | Baxter, Jr. et al. ....................... 475/295 |
| 5,284,068 | 2/1994 | Frost . |
| 5,346,442 | 9/1994 | Eastman . |
| 5,584,776 | 12/1996 | Weilant et al. ..................... 74/665 GE |
| 5,613,587 | 3/1997 | Baxter, Jr. .......................... 74/665 GE |
| 5,655,986 | 8/1997 | Wilson et al. . |
| 5,700,222 | 12/1997 | Bowen . |
| 5,702,321 | 12/1997 | Bakowski et al. . |
| 5,704,867 | 1/1998 | Bowen . |

Primary Examiner—Dirk Wright
Attorney, Agent, or Firm—Harness, Dickey & Pierce, P.L.C.

[57] ABSTRACT

A transfer case for a four-wheel drive vehicle having a planetary gear assembly and a synchronized range clutch operably associated with the input to the planetary gear assembly which can be selectively shifted on-the-fly for establishing high-range and low-range speed ratios. A mode clutch is operably disposed between the front and rear output shafts and can be selectively or automatically shifted for establishing a four-wheel drive mode.

26 Claims, 4 Drawing Sheets

TWO-SPEED TRANSFER CASE WITH SYNCHRONIZED RANGE SHIFT MECHANISM

BACKGROUND OF THE INVENTION

The present invention relates generally to transfer cases for use in four-wheel drive vehicles. More particularly, the present invention relates to a transfer case having a two-speed gear reduction unit and a synchronized range shift mechanism for permitting on-the-fly shifting between high-range and low-range drive modes.

As is now conventional, many light-duty and sport-utility vehicles are equipped with a transfer case for transmitting drive torque to all four of the wheels, thereby establishing a four-wheel drive mode of operation. To accommodate differing road surfaces and conditions, many transfer cases are equipped with a gear reduction unit which can be selectively shifted to permit the vehicle operator to choose between a four-wheel high-range (i.e., direct ratio) drive mode and a four-wheel low-range (i.e., reduced ratio) drive mode. In many instances, the four-wheel drive vehicle must be stopped before the transfer case can be shifted between its four-wheel high-range and low-range drive modes. Unfortunately, the need to stop the vehicle prior to shifting between the available four-wheel high-range and low-range drive modes is inconvenient, particularly upon encountering road conditions or surface terrains where continuation of the vehicle's rolling momentum would assist in overcoming the conditions encountered. To alleviate a portion of this inconvenience, some gear reduction units have been designed which permit the vehicle operator to shift without stopping the vehicle (i.e., "on-the-fly") from the four-wheel low-range drive mode into the four-wheel high-range drive mode. For example, U.S. Pat. No. 5,054,335 discloses a transfer case equipped with a synchronized range shift arrangement for "on-the-fly" shifting of a layshaft-type gear reduction unit. Alternatively, commonly-owned U.S. Pat. No. 5,346,442 discloses a transfer case having a synchronized range shift arrangement for "on-the-fly" shifting of a planetary-type gear reduction unit. Finally, U.S. Pat. No. 4,569,252 discloses a planetary-type gear reduction unit which permits synchronized shifting into and out of the high-range drive mode and the low-range drive mode.

In addition to the gear reduction unit, many transfer cases are also equipped with a mode shift mechanism which permits the vehicle operator to selectively shift between a two-wheel drive mode wherein only the primary (i.e., rear) driveline is driven and a "part-time" four-wheel drive mode wherein the secondary (i.e., front) driveline is rigidly coupled for rotation with the primary driveline. Reference may be made to commonly-owned U.S. Pat. No. 4,770,280 for disclosure of an exemplary part-time transfer case equipped with a gear reduction unit and a synchronized mode shift mechanism. In view of increased consumer popularity in four-wheel drive vehicles for everyday use, the mode shift mechanism in some two-speed transfer cases is replaced with a multi-plate clutch assembly which is operable for transmitting drive torque automatically (i.e., on-demand) to the secondary driveline, without any input or action on the part of the vehicle operator, when traction is lost at the primary wheels. Reference may be made to commonly-owned U.S. Pat. No. 5,363,938 for disclosure of an exemplary two-speed transfer case equipped with a clutch assembly interactively associated with an electronic control system and a sensor arrangement. While such prior art arrangements provide a compact construction, there is a continuing need to develop low cost, simplified alternatives which meet modern requirements for low noise and weight.

SUMMARY OF THE INVENTION

It is therefore an object of the present invention to provide a transfer case for a four-wheel drive vehicle having a planetary gear assembly and a range shift mechanism which is operably associated with the input of the planetary gear assembly which can be selectively actuated for establishing a four-wheel high-range drive mode, a neutral mode, and a four-wheel low-range drive mode.

As a related object of the present invention, a synchronized range shift mechanism is provided for permitting "on-the-fly" shifting of the transfer case between the four-wheel high-range and low-range drive modes.

According to another object of the present invention, the transfer case includes a mode shift mechanism which is operable in conjunction with the output of the planetary gear assembly and which can be selectively actuated for establishing a part-time four-wheel drive mode and a two-wheel drive mode.

As a related object, a synchronized mode shift mechanism is provided for permitting on-the-fly shifting of the transfer case between the two-wheel drive mode and the part-time four-wheel drive mode.

In accordance with another object of the present invention, the transfer case can be equipped with a transfer clutch for establishing an on-demand four-wheel drive mode.

According to a preferred embodiment of the present invention, the planetary gear assembly is operably installed between an input shaft and front and rear output shafts of the transfer case. The planetary gear assembly is a planetary gearset operably installed between the input shaft and the rear output shaft for driving the rear output shaft at either of a first speed ratio (i.e., "high-range") or a second speed ratio (i.e., "low-range") relative to the input shaft. A synchronized range shift mechanism is provided which includes a range clutch operable in a first range position for coupling the input shaft to a first component of the planetary gearset for establishing the high-range drive connection. The range clutch is operable in a second range position for coupling the input shaft to a second component of the planetary gearset for establishing the low-range drive connection. Finally, the range clutch is operable in a third range position to disconnect the input shaft from the first and second components of the planetary gearset for establishing a Neutral mode. The transfer case further includes a mode shift mechanism having a mode clutch which is movable between two mode positions. In the first mode position, the mode clutch rigidly interconnects the front output shaft to the rear output shaft for inhibiting relative rotation therebetween, thereby establishing the part-time four-wheel drive mode. In the second mode position, the mode clutch disconnects the front output shaft from the rear output shaft such that all drive torque is transmitted to the rear output shaft, thereby establishing the two-wheel drive mode.

As an alternative feature, the transfer case can include a transfer clutch having a clutch pack with a first set of clutch plates fixed for rotation with front output shaft and a second set of clutch plates fixed for rotation with the rear output shaft. During normal driving conditions, the transfer clutch permits a limited amount of speed differentiation between the front and rear output shafts. When traction is lost at the rear wheels, the transfer clutch automatically transfers torque to the front output shaft, thereby regulating the torque distribution ratio between the front and rear output shafts.

Additional objects, features and advantages of the present invention will become apparent from studying the following detailed description and appended claims when taken in conjunction with the accompanying drawings.

DETAILED DESCRIPTION OF THE PREFERRED EMBODIMENTS

In general, the present invention relates to a planetary gear assembly installed in the transfer case of a four-wheel drive motor vehicle and a synchronized range shift mechanism operably associated with the input of the planetary gear assembly for permitting "on-the-fly" shifting of the transfer case between a low-range speed ratio and a high-range speed ratio during motive operation of the motor vehicle. Additionally, a mode clutch is operably associated with the output shafts of the transfer case for selectively or automatically shifting between a four-wheel drive mode and a two-wheel drive mode.

Figure 1:
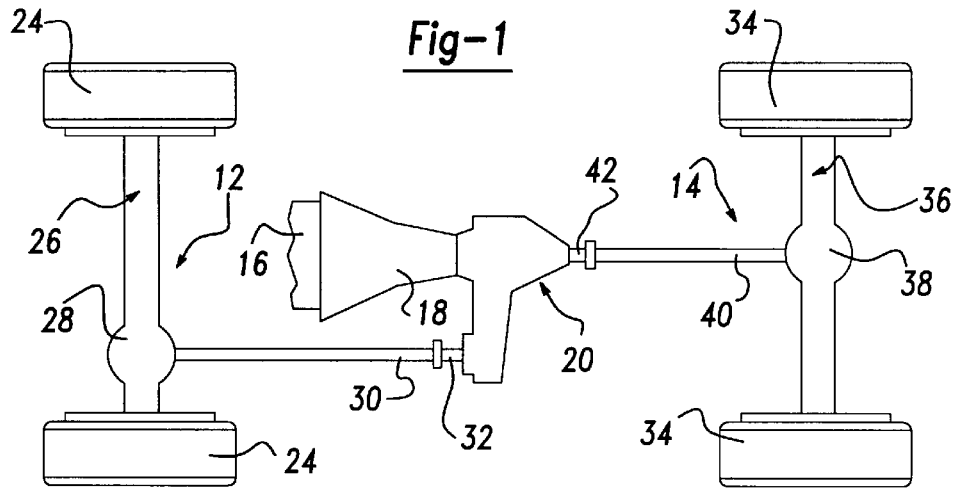
FIG. 1 illustrates the drivetrain of a four-wheel drive motor vehicle equipped with the transfer case of the present invention.

With particular reference to FIG. 1 of the drawings, a drivetrain 10 for a four-wheel drive vehicle is shown. Drivetrain 10 includes a front driveline 12 and a rear driveline 14 both drivable from a source of power, such as an engine 16, through a transmission 18 which may be of either the manual or automatic type. In the particular embodiment shown, drivetrain 10 is an full-time four-wheel drive system which incorporates a transfer case 20 for transmitting drive torque from engine 16 and transmission 18 to front driveline 12 and rear driveline 14. Front driveline 12 is shown to include a pair of front wheels 24 connected at opposite ends of a front axle assembly 26 having a front differential 28 that is coupled to one end of a front propshaft 30, the opposite end of which is coupled to a front output shaft 32 of transfer case 20. Similarly, rear driveline 14 includes a pair or rear wheels 34 connected at opposite ends of a rear axle assembly 36 having a rear differential 38 coupled to one end of a rear propshaft 40, the opposite end of which is interconnected to a rear output shaft 42 of transfer case 20.

Figure 2:
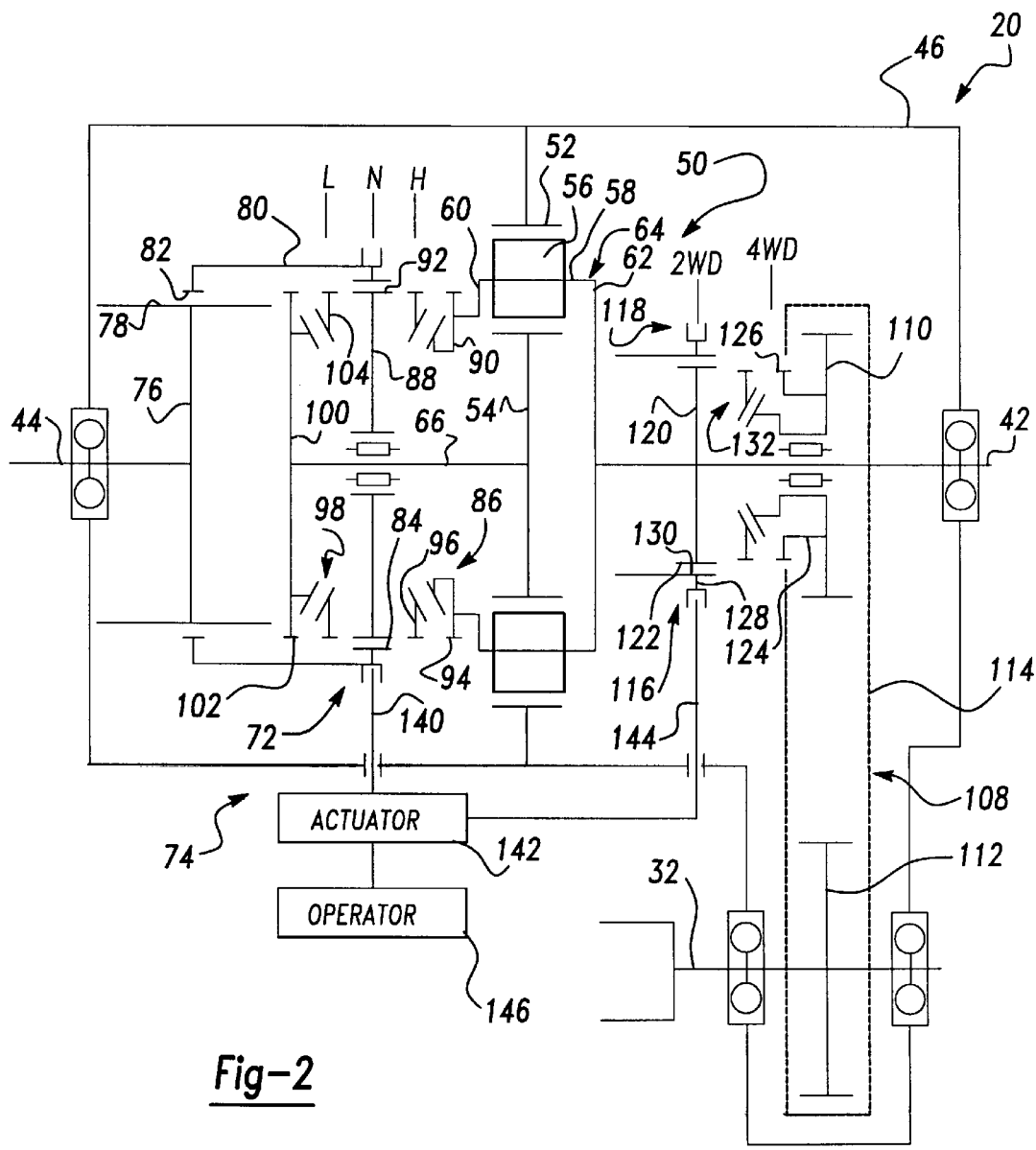
FIG. 2 is a schematic drawing of a two-speed part-time transfer case according to one embodiment of the present invention.

With particular reference to FIG. 2 of the drawings, transfer case 20 is schematically shown to include an input shaft 44 which is rotatably supported in a housing 46. Input shaft 44 is adapted for connection to an output shaft (not shown) of transmission 18 such that both are rotatably driven by engine 16 of the motor vehicle. Likewise, front output shaft 32 and rear output shaft 42 are rotatably supported in housing 46. Transfer case 20 is also shown to include a planetary gear assembly 50 which is operably installed between input shaft 44 and rear output shaft 42. Planetary gear assembly 50 includes a ring gear 52 fixed to housing 46, a sun gear 54, and a set of first pinion gears 56 which are each rotatably supported on a pinion shaft 58 and meshed with sun gear 54 and ring gear 52. Each pinion shaft 58 extends between a front carrier ring 60 and a rear carrier ring 62 which are interconnected to define a carrier assembly 64. Sun gear 54 is fixed to a quill shaft 66. As shown, rear carrier ring 62 is fixed to rear output shaft 42 such that driven rotation of carrier assembly 64 causes concurrent rotation of rear output shaft 42.

Planetary gear assembly 50 functions as a two-speed gear reduction unit which, in conjunction with a range clutch 72 of a synchronized range shift mechanism 74, is operable to establish a first or high-range speed ratio drive connection between input shaft 44 and carrier assembly 64 by directly coupling input shaft 44 to front carrier ring 60 of carrier assembly 64. Likewise, a second or low-range speed ratio drive connection is established by range clutch 72 between input shaft 44 and carrier assembly 64 by coupling input shaft 44 to sun gear 54. A Neutral mode is established when input shaft 44 is uncoupled for both carrier assembly 64 and sun gear 54.

To provide means for selectively establishing the high-range and low-range drive connections between input shaft 44 and carrier assembly 64, synchronized range shift mechanism 74 is provided. As noted, synchronized range shift mechanism 74 is operable for permitting transfer case 20 to be shifted "on-the-fly" between its high-range and low-range drive modes. As also noted previously, synchronized range shift mechanism 74 includes range clutch 72 which is operable for selectively coupling input shaft 44 to either of carrier assembly 64 or sun gear 54. In particular, range clutch 72 includes a drive gear or hub 76 that is fixed to input shaft 44. Drive hub 76 has an outer cylindrical rim on which external gear teeth or longitudinal splines 78 are formed. Range clutch 72 further includes a range sleeve 80 having a first set of internal splines 82 that are in constant mesh with external splines 78 on drive hub 76. Thus, range sleeve 80 is mounted for rotation with and axial sliding movement on drive hub 76 such that driven rotation of input shaft 44 causes concurrent rotation of range sleeve 80. Range sleeve 80 is shown to also include a second set of internal splines 840 which are offset axially from the first set of internal splines 82.

Range clutch 72 also includes a first synchronizer assembly 86 operably located between a neutral hub 88 rotatably supported on quill shaft 66 and a first clutch plate 90 which is fixed to front carrier ring 60 of carrier assembly 64. Neutral hub 88 has extended splines 92 formed thereon while first clutch plate 90 has external clutch teeth 94 formed thereon. First synchronizer assembly 86 is operable for causing speed synchronization between input shaft 44 and carrier assembly 64 in response to movement of range sleeve 80 from a neutral position (denoted by position line "N") toward a high-range position (denoted by position line "H"). Once the speed synchronization process is completed, range sleeve 80 is permitted to move through the teeth of a blocker ring 96 and into coupled engagement with first clutch plate 90 such that its splines 84 meshingly engage clutch teeth 94 on first clutch plate 90. Accordingly, with range sleeve 80 positioned in its H position, drive hub 76 is drivingly coupled to first clutch plate 90 such that carrier assembly 64 is coupled to rotate at the same speed as input shaft 44 for establishing the high-range drive connection.

Range clutch apparatus 72 further includes a second synchronizer assembly 98 operably disposed between neutral hub 88 and a second clutch plate 100 which is fixed to quill shaft 66 and has external clutch teeth 102 formed thereon. Second synchronizer assembly 98 is operable for causing speed synchronization between sun gear 54 and input shaft 44 in response to movement of range sleeve 80 from its N position toward a low-range position (denoted by position line "L"). Once speed synchronization is complete, range sleeve 80 is permitted to move through the teeth of a second blocker ring 104 and into coupled engagement with second clutch plate 100 such that its splines 84 meshingly engage clutch teeth 102 on second clutch plate 100 for establishing the low-range drive connection therebetween. With range sleeve 80 positioned in its L position, sun gear 54 drives first pinion gears 56 about stationary ring gear 52 such that carrier assembly 64 is driven at a reduced speed ratio relative to input shaft 44, thereby establishing the low-range drive connection. While only schematically shown, first synchronizer assembly 86 and second synchronizer assembly 98 can be any conventional construction such as, for example, single-cone or dual-cone arrangements. Thus, it will be appreciated by those skilled in the art that any type of suitable synchronizer arrangement can be used for facilitating speed synchronization between the components that are to be directly coupled.

Range sleeve 80 is shown in its Neutral position (denoted by position line "N") whereat its splines 84 are released from engagement with clutch teeth 94 on first clutch plate 90 and clutch teeth 102 on second clutch plate 100 and yet are engaged with teeth 92 on neutral hub 88. As such, driven rotation of input shaft 44 causes rotation of range sleeve 80 and neutral hub 88 which, as noted, is rotatably supported on quill shaft 66. Since range sleeve 80 does not couple input shaft 44 to either of clutch plates 90 and 100 when it is in its N position, no drive torque is transferred through carrier assembly 64 to front and rear output shafts 32 and 42, respectively, thereby establishing the Neutral non-driven mode. Thus, splines 82 on range sleeve 80 maintain engagement with splines 78 on hub 76 throughout the entire length of axial travel of range sleeve 80 between its H and L positions. Moreover, splines 82 do not engage clutch teeth 102 on second clutch plate 100 when range sleeve 96 is in its H position.

As seen, a transfer assembly 108 is provided for selectively transferring drive torque from rear output shaft 42 to front output shaft 32. Transfer assembly 108 includes a drive sprocket 110 rotatably supported on rear output shaft 42, a driven sprocket 112 fixed to front output shaft 32, and a continuous chain 114 interconnecting driven sprocket 112 to drive sprocket 110. To provide means for establishing a drive connection between rear output shaft 42 and front output shaft 32, transfer case 20 includes a mode shift mechanism 116. Mode shift mechanism 116 includes a mode clutch 118 which is operable to couple drive sprocket 110 to rear output shaft 42 for establishing a four-wheel drive mode in which front output shaft 32 is rigidly coupled for rotation with rear output shaft 42. In addition, mode clutch 118 is operable for selectively uncoupling drive sprocket 110 from rear output shaft 42 for establishing a two-wheel drive mode in which all drive torque is delivered to rear output shaft 42.

According to the embodiment shown in FIG. 2, mode clutch 118 includes a driven hub 120 fixed to rear output shaft 42 and having an outer cylindrical rim on which external splines 122 are formed, a clutch plate 124 fixed to drive sprocket 110 having an outer cylindrical rim with external clutch teeth 126 formed thereon, and a mode sleeve 128 having a set of internal splines 130 which are in constant mesh with external spline 122 of driven hub 120 such that mode sleeve 128 can be slid axially relative thereto. In FIG. 2, mode sleeve 128 is shown in a first or two-wheel drive mode position (denoted by position line "2WD") whereat its spline teeth 130 are disengaged from clutch teeth 126 on clutch plate 124. In this mode position, drive sprocket 110 is uncoupled from rear output shaft 42 such that driven rotation of carrier assembly 64 causes all drive torque to be transmitted to rear output shaft 42, thereby establishing the two-wheel drive mode. Rearward axial movement of mode sleeve 128 from its 2WD position to a second or part-time four-wheel drive mode position (denoted by position line "4WD") maintains engagement of mode sleeve splines 130 with drive hub splines 122 and causes mode sleeve splines 130 to also engage clutch teeth 126 on clutch plate 124. In this mode position, relative rotation is prevented between rear output shaft 42 and front output shaft 32, thereby establishing the part-time four-wheel drive mode. In a four-wheel drive vehicle equipped with a live front axle, mode sleeve 124 can be shifted on-the-fly when the vehicle is travelling in a straight line since there is little, if any, relative rotation between front output shaft 32 and rear output shaft 42. However, mode shift mechanism 116 is shown equipped with a synchronizer assembly 132 between driven hub 120 and clutch plate 124 for permitting on-the-fly shifting of mode sleeve 128 between its 4WD and 2WD mode positions in those vehicle applications where front driveline 12 is equipped with an axle disconnect mechanism. In particular, this arrangement permits front wheels 24 to be disconnected from the remainder of axle assembly 26 via the use of conventional vacuum-actuated locking hubs or an axle-shaft disconnect system when transfer case is shifted into the two-wheel drive mode.

Referring still to FIG. 2, the shift system associated with transfer case 20 is shown to include a range fork 140 coupling range sleeve 80 to an actuator 142, a mode fork 144 coupling mode sleeve 128 to actuator 142, and an operator 146 for controlling selective actuation of actuator 142. Actuator 142 can be any suitable device that is operable to cause coordinated axial movement of range sleeve 80 and mode sleeve 128 in response to a particular drive mode selected by the vehicle operator via manipulation of operator 146. Alternatively, actuator 142 can be a pair of devices separately connected to each shift fork. Preferably, actuator 142 is a rotatable sector plate having range and mode cam arrangements for coordinated axial movement of shift forks 140 and 144 in a manner generally similar to that described in commonly owned U.S. Pat. No. 5,076,112, which is incorporated herein by reference. Additionally, operator 146 can be any suitable manually-actuated (i.e., a linkage coupling actuator 142 to a gearshift lever) or power-actuated (i.e., a gearmotor connected to actuator 142 and controlled by electric control signals from push-buttons or rotary switches) arrangement under the control of the vehicle operator for controlling actuation of actuator 142.

Figure 3:
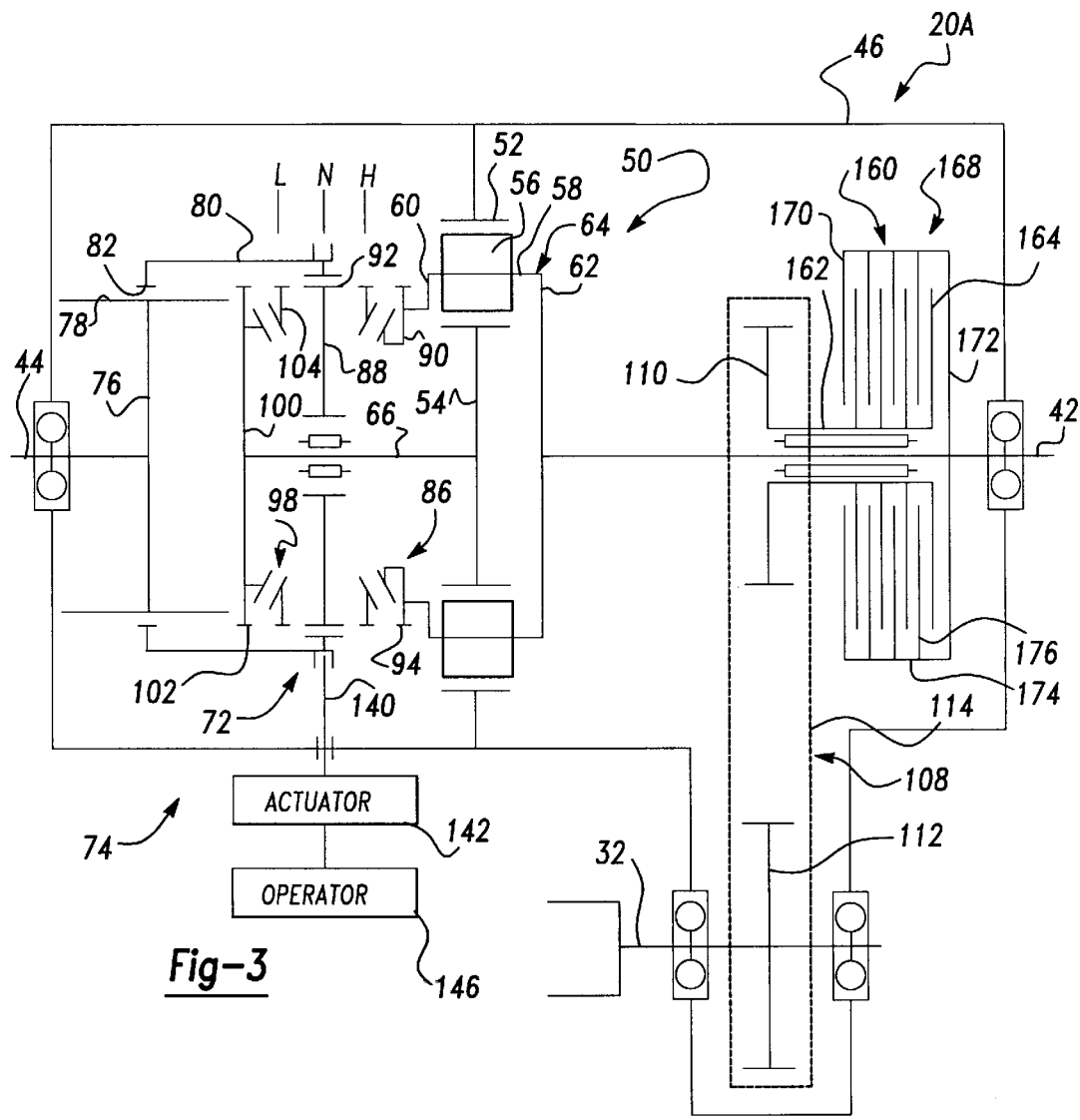
FIG. 3 is a schematic drawing of a two-speed on-demand transfer case according to an alternative embodiment of the present invention.

To provide means for automatically controlling the torque distribution between front and rear output shafts 32 and 42, respectively, a transfer case 20A is shown in FIG. 3 to include a transfer clutch 160. Transfer clutch 160 is normally operable in a non-actuated mode for transmitting all drive torque to rear output shaft 42, thereby establishing the two-wheel drive mode. Transfer clutch 160 is also operable in a fully-actuated mode for establishing a "locked" four-wheel drive mode in which front output shaft 32 is rigidly coupled to rear output shaft 42. Transfer clutch 160 is, in the embodiment shown in FIG. 3, a sealed torque transfer device, such as a viscous coupling or a geared traction unit which can progressively regulate the amount of torque transferred to front output shaft 32 automatically (i.e., on-demand) between its non-actuated and fully-actuated modes in response to and as a function of the amount of relative rotation (i.e., interaxle slip) between front output shaft 32 and rear output shaft 42. The torque versus slip characteristics of transfer clutch 160 can be tuned to meet specific vehicular applications.

Transfer clutch 160 includes an inner hub 162 fixed to drive sprocket 110 and to which a set of inner clutch plates 164 are fixed. Transfer clutch 160 also includes a drum assembly 168 comprised of front and rear end plates 170 and 172, respectively, which are sealed relative to inner hub 162, and a drum 174 to which end plates 170 and 172 are secured. Drum 174 is cylindrical and has a set of outer clutch plates 176 fixed thereto which are alternately interleaved with inner clutch plate 164 to define a multi-plate clutch pack. The pressure chambers defined between inner hub 162 and drum assembly 168 is filled with a predetermined volume of a viscous fluid which causes torque to be delivered to the slower rotating set of clutch plates due to the relative rotation therebetween in a know manner.

Figure 4:
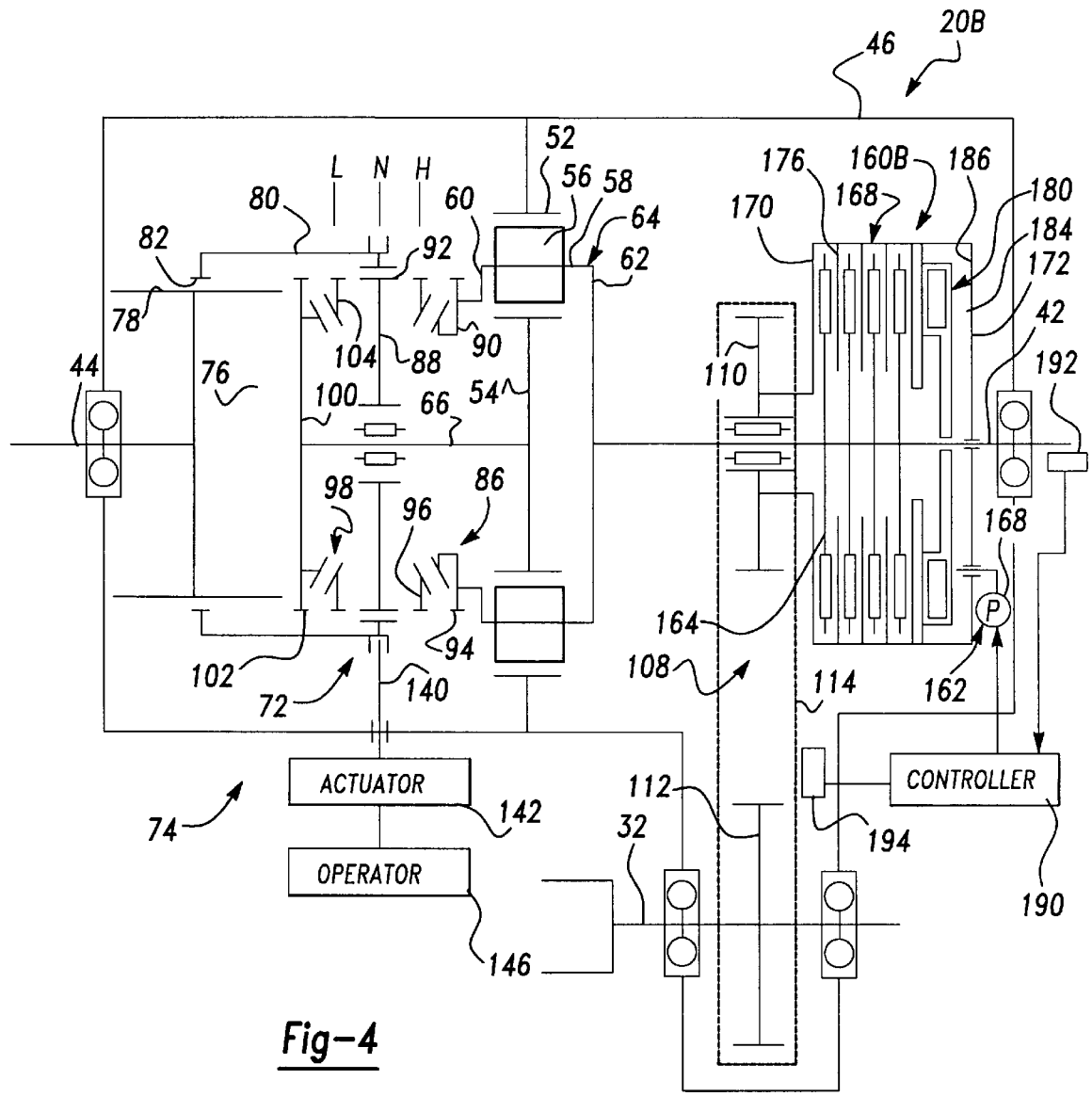
FIG. 4 is a schematic drawing of an alternative construction for the two-speed on-demand transfer case of the present invention.

FIG. 4 illustrates a transfer case 20B which is a modified version of transfer case 20A of FIG. 3. In particular, transfer case 20B is equipped with a transfer clutch 160A having a set of outer clutch plates 176 fixed to drum assembly 168 which is fixed for rotation with drive sprocket 110, and a set of inner clutch plates 164 fixed for rotation with rear output shaft 42 alternatively interleaved with outer clutch plates 176 to define a clutch pack. Transfer clutch 160B further includes a thrust mechanism 180 for exerting a clutch engagement force on the clutch pack and an actuator 182 for controlling the magnitude of the clutch engagement force as a function of the amount of interaxle slip. In particular, thrust mechanism 180 includes a piston 184 which is axially movable within a pressure chamber 186 of transfer clutch 160B for movement relative to the clutch pack. As shown, actuator 182 is a pump 188 which supplies high pressure hydraulic fluid from a sump to pressure chamber 186 for controlling the axial position of piston 184 relative to the clutch pack and, as such, the clutch engagement force exerted thereon. Pump 188 can be a shaft driven device, such as a gerotor pump or a gear pump, in which the output pressure generated and supplied to pressure chamber 186 is proportional to the speed difference between front output shaft 32 and rear output shaft 42. Alternatively, the output pressure generated by pump 188 can be adaptively controlled using a control system having a controller 190 which receives input signals from a rear speed sensor 192 and a front speed sensor 194. Controller 190 determines the real time value of the speed difference from the sensor signals supplied by speed sensors 192 and 194 and sends a control signal to pump 168 which regulates its output pressure as a function of the speed difference.

Controller 190 can be programmed to control actuation of transfer clutch 160B pursuant to an ON/Off control scheme. In such an arrangement, transfer clutch 160B is normally maintained in an non-actuated state to completely or substantially disengage front output shaft 32 from driven rotation with rear output shaft 42. In this state, transfer case 20B is defined as operating in its two-wheel drive mode. However, when the sensor input signals indicate a vehicular condition exceeding a predetermined value, transfer clutch 160B is fully actuated for "locking" front and rear output shafts 32 and 42 against relative rotation whereby they are, in effect, rigidly coupled for establishing the locked four-wheel drive mode. Preferably, the vehicular condition used for controlling actuation of transfer clutch 160B is the speed differential between front output shaft 32 and rear output shaft 42. Thereafter, transfer clutch 160B is returned to its non-actuated state when the sensor input signals indicate that the magnitude of the vehicular condition is less than a predetermined value. Alternatively, controller 190 can be programmed in accordance with an ADAPTIVE control scheme to regulate the actuated condition of transfer clutch 160B between its non-actuated and fully-actuated limits for varying the magnitude of drive torque transmitted to front output shaft 32 as a function of the sensor input signals. In operation, transfer clutch 160B increases the amount of drive torque delivered to the slower turning output shaft while concurrently decreasing the drive torque delivered to the faster turning output shaft in an amount equal to the torque capacity of the clutch at a given actuated state. In either of the above-noted control schemes, control over actuation of transfer clutch 160B is automatic and does not require any act or mode selection on the part of the vehicle operator. Under both control schemes, the process of monitoring vehicle conditions and controlling clutch engagement is continuous and automatic.

Figure 5:
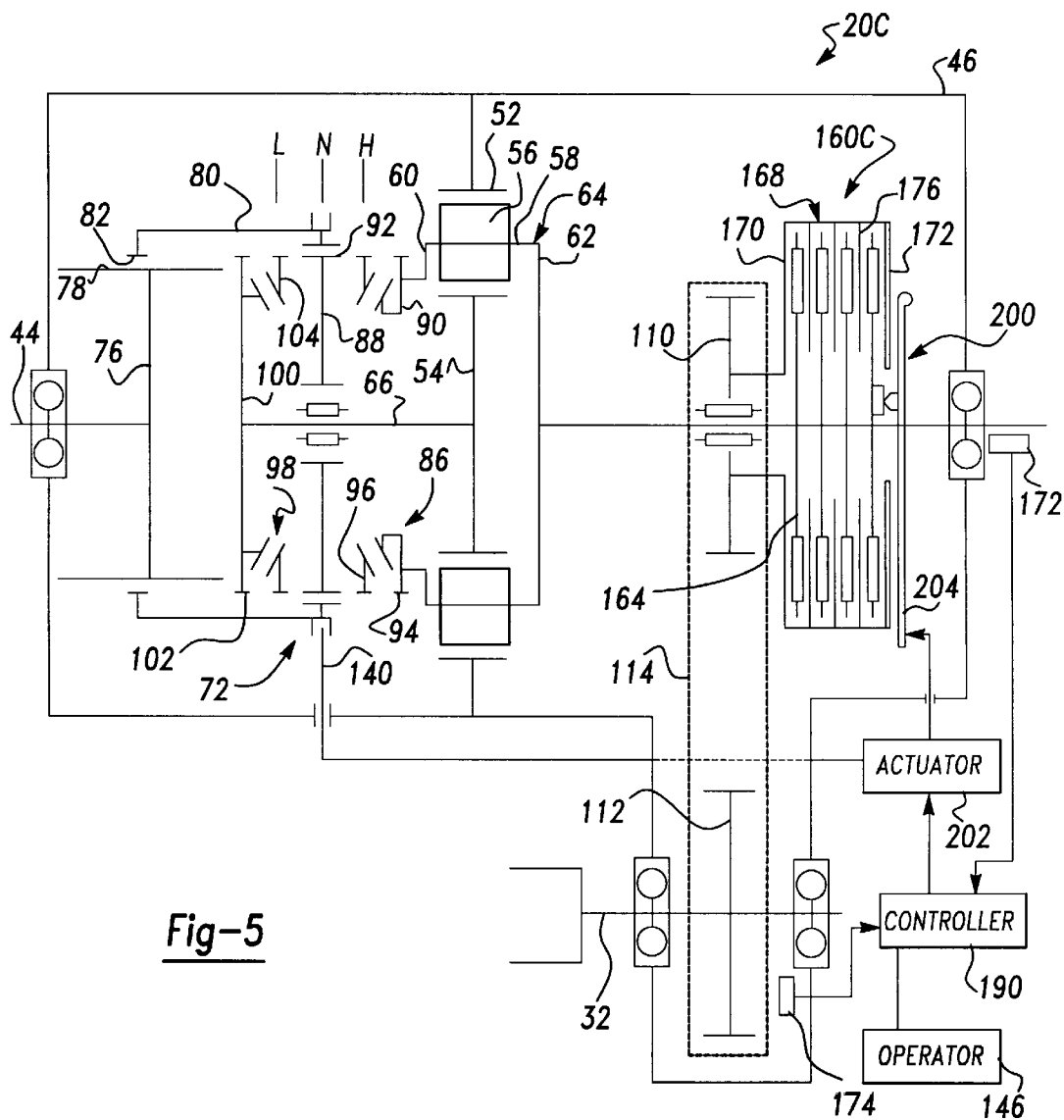
FIG. 5 is a schematic of another alternative embodiment of a two-speed on-demand transfer case.

FIG. 5 illustrates a transfer case 20C equipped with a mechanically-actuated transfer clutch 160C. In particular, transfer clutch 160C is an electronically-controlled clutch assembly operably disposed between front output shaft 32 and rear output shaft 42 to automatically control the torque distribution ratio therebetween. Transfer clutch 160C has a thrust mechanism 200 for exerting a clutch engagement force on the clutch pack with an actuator 202 controlling the magnitude of the clutch engagement force as a function of the value of interaxle slip. In particular, thrust mechanism 200 includes a pivotable lever arm assembly 204. Again, controller 190 controls the frictional biasing applied by transfer clutch 160C in response to a control signal generated based on the value of the sensor input signals. Preferably, actuator 202 is a sector plate having a range shift arrangement similar to actuator 142 in FIG. 2 but modified to include a second cam surface for also controlling pivotal movement of lever arm assembly 204. The cam surfaces can be arranged to facilitate coordinated movement of range sleeve 80 and lever arm assembly 204 to permit the vehicle operator to select, via actuation of operator 146, a two-wheel high-range drive mode, a neutral mode, locked four-wheel high-range and low-range drive modes and on-demand high-range and low-range drive modes. In the on demand drive modes, transfer clutch 160C is controlled automatically under either of the ON/OFF or ADAPTIVE schemes. When one of the locked four-wheel drive modes is selected, transfer clutch 160C is held in its fully-actuated state. Obviously, the mode selections described above are also available with biasing clutch 160B of transfer case 20A.

The foregoing discussion discloses and describes various embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A transfer case for use in a four-wheel drive vehicle having a power source and front and rear drivelines, comprising:

a housing;

an input shaft rotatably supported by said housing and driven by the power source;

a front output shaft rotatably supported by said housing and connected to the front driveline;

a rear output shaft rotatably supported in said housing and connected to the rear driveline;

a planetary gear assembly interconnecting said input shaft to said rear output shaft for delivering drive torque from the power source to the rear driveline, said planetary gear assembly including a carrier assembly coupled to said rear output shaft, a sun gear, a ring gear fixed to said housing, and a planet gear rotatably supported by said carrier assembly and meshed with said sun gear and said ring gear;

a range clutch for selectively coupling said input shaft to said carrier assembly for driving said rear output shaft at a first speed ratio relative to said input shaft for establishing a high-range drive mode, and said range clutch is further operable for selectively coupling said input shaft to said sun gear for causing said rear output shaft to be driven at a second speed ratio relative to said input shaft for establishing a low-range drive mode; and a mode clutch for automatically transferring drive torque from said rear output shaft to said front output shaft in response to a speed differential therebetween exceeding a predetermined value.

2. The transfer case of claim 1 wherein said range clutch is a synchronizer clutch operable for causing speed synchronization between said input shaft and said carrier assembly, and said synchronizer clutch is further operable for causing speed synchronization between said input shaft and said sun gear.

3. The transfer case of claim 1 wherein said range clutch includes a range sleeve rotatably driven by said input shaft and movable from a neutral position to a high-range position and a low-range position, said range sleeve is operable in said high-range position to couple said carrier assembly with said input shaft and in said low-range position to couple said sun gear with said input shaft, and said range sleeve is operable in said neutral position to uncouple said input shaft from both of said carrier assembly and said sun gear for establishing a Neutral non-driven mode.

4. The transfer case of claim 3 wherein said range clutch includes a first synchronizer operably disposed between said carrier assembly and said input shaft for inhibiting movement of said range sleeve to said high-range position until speed synchronization is established therebetween, and a second synchronizer operably disposed between said sun gear and said input shaft for inhibiting movement of said range sleeve to said low-range position until speed synchronization is established therebetween.

5. The transfer case of claim 4 wherein said range clutch includes a drive hub fixed for rotation with said input shaft and on which said range sleeve is supported for rotation therewith and sliding movement thereon between said high-range, low-range and neutral positions, a first clutch plate fixed to said carrier assembly, and a second clutch plate fixed to said sun gear, wherein said first synchronizer is disposed between said drive hub and said first clutch plate for inhibiting movement of said range sleeve into said high-range position whereat said range sleeve is coupled to said first clutch plate until speed synchronization is established therebetween, and wherein said second synchronizer is disposed between said drive hub and said second clutch plate for inhibiting movement of said range sleeve to said low-range position whereat said range sleeve is coupled to said second clutch plate until speed synchronization is established therebetween.

6. The transfer case of claim 1 wherein said mode clutch is a multi-plate clutch assembly having a first set of clutch plates fixed for rotation with said rear output shaft, a second set of clutch plates fixed for rotation with said front output shaft and which are interleaved with said first set of clutch plates, and means for transferring drive torque from the faster rotating clutch plates to the slower rotating clutch plates in response to said speed differential exceeding said predetermined value.

7. The transfer case of claim 6 wherein said mode clutch is a viscous coupling.

8. The transfer case of claim 7 wherein said mode clutch includes a thrust mechanism for exerting a clutch engagement force on said interleaved clutch plates having a magnitude which is proportional to the magnitude of said speed differential.

9. The transfer case of claim 8 wherein said mode clutch includes a piston retained in a pressure chamber for applying said clutch engagement force on said interleaved clutch plates, and a pump for supplying fluid under pressure to said pressure chamber in response to the occurrence of said speed differential.

10. The transfer case of claim 9 further comprising sensors for detecting an operating characteristic of the vehicle and generating sensor signals in response thereto, and a controller for receiving said sensor signals and controlling fluid pressure supplied by said pump to said pressure chamber as a function of said sensor signals.

11. The transfer case of claim 8 wherein said mode clutch includes an actuator for generating said clutch engagement force.

12. The transfer case of claim 11 further comprising sensors for detecting an operating characteristic of the vehicle and generating sensor signals in response thereto, and a controller for receiving said sensor signals and controlling said actuator as a function of said sensor signals.

13. A transfer case for use in a four-wheel drive vehicle having a power source and front and rear drivelines, comprising:

a housing;

an input shaft rotatably supported by said housing and driven by the power source;

a front output shaft rotatably supported by said housing and connected to the front driveline;

a rear output shaft rotatably supported in said housing and connected to the rear driveline;

a planetary gear assembly for interconnecting said input shaft to said rear output shaft for delivering drive torque from the power source to the rear driveline, said planetary gear assembly including a carrier assembly coupled to said rear output shaft, a sun gear, a ring gear fixed to said housing, and a planet gear rotatably supported by said carrier assembly and meshed with said sun gear and said ring gear;

a range clutch for selectively coupling said input shaft to said carrier assembly for driving said rear output shaft at a first speed ratio relative to said input shaft for establishing a high-range drive mode, and said first clutch is further operable for selectively coupling said input shaft to said sun gear for causing said carrier assembly to drive said rear output shaft at a second speed ratio relative to said input shaft for establishing a low-range drive mode, said range clutch includes a synchronizer for causing speed synchronization between said input shaft and said carrier assembly, and said synchronizer is further operable for causing speed synchronization between said input shaft and said sun gear; and a mode clutch operably disposed between said front and rear output shafts and which is operable in a first mode for permitting speed differentiation between said front and rear output shafts and establishing a two-wheel drive mode, said mode clutch is further operable in a second mode for transferring drive torque from said rear output shaft to said front output shaft and establishing an on-demand four-wheel drive mode.

14. The transfer case of claim 13 wherein said range clutch includes a range sleeve rotatably driven by said input shaft and movable from a neutral position to a high-range position and a low-range position, said range sleeve is operable in said high-range position to couple said carrier assembly with said input shaft and in said low-range position to couple said sun gear with said input shaft, and said range sleeve is operable in said neutral position to uncouple said input shaft from both of said carrier assembly and said sun gear for establishing a Neutral non-driven mode, wherein said range clutch includes a first synchronizer operably disposed between said carrier assembly and said input shaft for inhibiting movement of said range sleeve to said high-range position until speed synchronization is established therebetween, and a second synchronizer operably disposed between said first sun gear and said input shaft for inhibiting movement of said range sleeve to said low-range position until speed synchronization is established therebetween.

15. The transfer case of claim 14 wherein said range clutch includes a drive hub fixed for rotation with said input shaft and on which said range sleeve is supported for rotation therewith and sliding movement thereon between said high-range, low-range and neutral positions, a first clutch plate fixed to said carrier assembly, and a second clutch plate fixed to said sun gear, wherein said first synchronizer is disposed between said drive hub and said first clutch plate for inhibiting movement of said range sleeve into said high-range position whereat said range sleeve is coupled to said first clutch plate until speed synchronization is established therebetween, and wherein said second synchronizer is disposed between said drive hub and said second clutch plate for inhibiting movement of said range sleeve to said low-range position whereat said range sleeve is coupled to said second clutch plate until speed synchronization is established therebetween.

16. The transfer case of claim 13 wherein said mode clutch has a first set of clutch plates fixed for rotation with said rear output shaft, a second set of clutch plates fixed for rotation with said front output shaft and which are interleaved with said first set of clutch plates, and means for transferring drive torque from the faster rotating clutch plates to the slower rotating clutch plates in response to a speed differential therebetween exceeding a predetermined value.

17. The transfer case of claim 16 wherein said mode clutch is a viscous coupling.

18. The transfer case of claim 17 wherein said mode clutch includes a thrust mechanism for exerting a clutch engagement force on said interleaved clutch plates having a magnitude which is proportional to the magnitude of said speed differential.

19. The transfer case of claim 18 wherein said mode clutch includes a piston retained in a pressure chamber for applying said clutch engagement force on said interleaved clutch plates, and a pump for supplying fluid under pressure to said pressure chamber in response to the occurrence of said speed differential.

20. The transfer case of claim 19 further comprising sensors for detecting an operating characteristic of the vehicle and generating sensor signals in response thereto, and a controller for receiving said sensor signals and controlling fluid pressure supplied by said pump to said pressure chamber as a function of said sensor signals.

21. The transfer case of claim 18 wherein said mode clutch includes an actuator for generating said clutch engagement force.

22. The transfer case of claim 21 further comprising sensors for detecting an operating characteristic of the vehicle and generating sensor signals in response thereto, and a controller for receiving said sensor signals and controlling said actuator as a function of said sensor signals.

23. A transfer case for use in a four-wheel drive vehicle having a power source and front and rear drivelines, comprising:

a housing;

an input shaft rotatably supported by said housing and driven by the power source;

a front output shaft rotatably supported by said housing and connected to the front driveline;

a rear output shaft rotatably supported in said housing and connected to the rear driveline;

a planetary gear assembly for interconnecting said input shaft to said rear output shaft for delivering drive torque from the power source to the rear driveline, said planetary gear assembly including a carrier assembly coupled to said rear output shaft, a sun gear, a ring gear fixed to said housing, and a planet gear rotatably supported by said carrier assembly and meshed with said sun gear and said ring gear;

a range sleeve coupled for rotation with said input shaft and movable between a high-range position coupling said carrier assembly for rotation with said input shaft, a low-range position coupling said sun gear for rotation with said input shaft, and a neutral position uncoupling said input shaft from both of said carrier assembly and said sun gear; and a mode sleeve coupled for rotation with said rear output shaft and movable between a 2WD position releasing said front output shaft from coupled engagement with said rear output shaft, and a 4WD position directly coupling said front output shaft to said rear output shaft.

24. The transfer case of claim 23 further comprising a first synchronizer that is operably disposed between said input shaft and said carrier assembly for inhibiting movement of said range sleeve to said high-range position until speed synchronization is established therebetween, and a second synchronizer that is operably disposed between said input shaft and said sun gear for inhibiting movement of said range sleeve to said low-range position until speed synchronization is established therebetween.

25. The transfer case of claim 24 further comprising a third synchronizer that is operably disposed between said rear output shaft and said front output shaft for inhibiting movement of said mode sleeve from said 2WD position to said 4WD position until speed synchronization is established therebetween.

26. The transfer case of claim 23 further comprising a synchronizer that is operably disposed between said rear output shaft and said front output shaft for inhibiting movement of said mode sleeve from said 2WD position to said 4WD position until speed synchronization is established therebetween.

* * * * *